United States Patent
Huisken

(10) Patent No.: US 7,949,374 B2
(45) Date of Patent: May 24, 2011

(54) PERSONAL COMMUNICATIONS SYSTEMS

(75) Inventor: Bartholomeus J. F. Huisken, Barcelona (ES)

(73) Assignee: Southwing S. L., Barcelona (ES)

( * ) Notice: Subject to any disclaimer, the term of this patent is extended or adjusted under 35 U.S.C. 154(b) by 748 days.

(21) Appl. No.: 11/816,559

(22) PCT Filed: Feb. 17, 2006

(86) PCT No.: PCT/GB2006/000564
§ 371 (c)(1),
(2), (4) Date: Aug. 17, 2007

(87) PCT Pub. No.: WO2006/087567
PCT Pub. Date: Aug. 24, 2006

(65) Prior Publication Data
US 2008/0146291 A1    Jun. 19, 2008

(30) Foreign Application Priority Data

Feb. 18, 2005 (GB) .................................. 0503456.6
Feb. 17, 2006 (WO) ............................. 2006/000564

(51) Int. Cl.
*H04M 1/00* (2006.01)
(52) U.S. Cl. .................. 455/569.1; 455/556.1; 455/564; 704/275
(58) Field of Classification Search ............... 455/569.1, 455/564, 556.1; 704/275
See application file for complete search history.

(56) References Cited

U.S. PATENT DOCUMENTS

| 5,673,304 | A | 9/1997 | Connor et al. |
| 6,198,821 | B1 | 3/2001 | Yang |
| 6,792,291 | B1 | 9/2004 | Topol et al. |
| 2003/0109290 | A1 | 6/2003 | Moffi et al. |
| 2004/0127189 | A1 | 7/2004 | Olivier et al. |
| 2004/0137967 | A1 | 7/2004 | Bodley |
| 2005/0064861 | A1* | 3/2005 | Nishida .......................... 455/420 |
| 2007/0005368 | A1* | 1/2007 | Chutorash et al. ............ 704/275 |

FOREIGN PATENT DOCUMENTS

| CN | 1471284 A | 1/2004 |
| EP | 0892533 | 1/1999 |
| EP | 0892533 A2 | 11/2000 |
| EP | 1184225 | 3/2002 |
| GB | 2327555 | 1/1999 |
| GB | 2407001 | 4/2005 |
| GB | 2409128 | 6/2005 |
| JP | 951369 | 2/1997 |
| KR | 20030032457 A | 4/2003 |

* cited by examiner

Primary Examiner — Danh C Le
(74) Attorney, Agent, or Firm — Hayes Soloway P.C.

(57) ABSTRACT

A hands-free device for a mobile communications device, and method thereof, includes a user-operable input means and means for detecting user operation of the user-operable input means. The hands-free device is head-mounted and has at least one of a speaker and a microphone. A memory stores data. Means for causing a communications device coupled with the hands free device are included, to establish a communication connection indicated by data stored in the memory in response to detection of user operation of the user-operable input means, wherein the data includes at least one of a number and an address to be called. A user may store in the memory of the hands-free device the data indicating the predetermined communications connection to be established. The memory may be programmable by the user such that the data indicating the predetermined communications connection to be established can be changed in use by the user.

22 Claims, 2 Drawing Sheets

7,949,374 B2

PERSONAL COMMUNICATIONS SYSTEMS

The present invention relates to personal communications systems, and in particular to hands-free devices for use with communications systems and/or communications devices.

It is increasingly common for communications devices, such as mobile phones, mobile radios, personal digital assistants (PDAs), etc., to be used with "hands-free" devices, such as wireless headsets, for convenience and other reasons. In such an arrangement, as is known in the art, the audio signals for an, e.g., telephone call, are routed via the hands-free device, rather than, e.g., being reproduced by the phone itself. The hands-free device may also offer some ability to control or operate the communications device and/or the audio signal provided to the user.

However, such hands-free devices are typically limited in terms of the control or functionality that they provide. For example, they may only provide limited control of the communications device's functions, such that it may still be necessary to use the communications device itself to access many of its functions.

The Applicants believe therefore that there remains scope for improvement to hands-free devices that may be used with communications devices and/or communications systems.

Thus, according to a first aspect of the present invention, there is provided a hands-free device for a communications device, comprising:
a user-operable input means;
means for detecting user operation of the user-operable input means; and
means for causing a communications device to which the hands-free device is coupled to attempt to call a particular number in response to detection of user operation of the user-operable input means.

According to a second aspect of the present invention, there is provided a method of operating a hands-free device for a communications device, the method comprising:
the hands-free device:
detecting a particular user input to the hands-free device; and
in response to such detection, causing a communications device to which the hands-free device is coupled to attempt to call a particular number.

The present invention provides a hands-free device that will, in response to a particular user input, cause its associated communications device or system to call a particular number. This allows a user to, in effect place a call to the particular number directly via the hands-free device. This has the advantage that the user does not, e.g., need to physically dial the particular number through the communications device, but rather can dial the number in a "hands-free" manner. This further enhances the functionality provided by the hands-free device, and allows, e.g., relatively fast and straightforward dialling of the number in question.

The present invention thus, in effect, provides a hands-free device that has a "direct call" function, in that a call to a particular number or numbers can be activated directly by a user via the hands-free device. Indeed, the Applicants have recognised that it would be desirable to provide hands-free devices with this functionality.

Thus, according to a third aspect of the present invention, there is provided a hands-free device for a communications device, comprising an input means for allowing a user to cause a communications device to make a call.

The hands-free device can be any suitable such device. In one preferred embodiment is a device that is intended to be worn by the user, such as a head-mounted device (e.g. headset, earpiece, helmet, glasses, etc.). It could also, e.g., be a device that is intended to be mounted to a surface, and/or to be carried by a user, such as an in-car hands-free kit or similar, and/or a desk-top hands-free system or other standalone module. It could also be a system that is worn elsewhere on the body, such as the wrist or that is embedded in clothing.

It should be noted here that by "hands-free" device is intended a device that allows the user at least to make communications to and/or receive communications from another source (in contrast to, e.g., a "panic-button"-type device that may send out a single signal, but that cannot thereafter or otherwise communicate anything to and/or from the user). Most preferably the user can at least receive (communications from another source) and/or establish communications (e.g. a communications path or channel) via the hands-free device. Such communications could, e.g., simply be for the user to receive transmissions (e.g. a call, message or broadcast) from elsewhere on or via the communications system or network via the hands-free device, although preferably two-way communication can be carried out via the hands-free device.

Thus, the hands-free device preferably includes at least a speaker (for replaying an audio signal to the user) and most preferably includes both a microphone and a speaker (to allow the user to participate in a two-way call via the hands-free device). The speaker and/or microphone may be, as is known in the art, and in some embodiments preferably are, integral with the hands-free device. The speaker may, as is known in the art, be in the form of headphones or an earpiece (or earpieces).

The hands-free device may be coupled to and control the communications device in any suitable manner, such as through a wired connection. The link between the hands-free device and the communications device should be such that at least some of the functions of the communications device can be controlled via the hands-free device, and, e.g., such that the user can participate in calls using the hands-free device. In a preferred embodiment, the hands-free device is wirelessly coupled to the communications device, most preferably via a short range RF (radio frequency) link, such as a "Bluetooth" link. Other forms of wireless linking, such as a magnetic induction, or an infra-red, arrangement could also be used.

As well as being operable in the manner of the present invention, the hands-free device should, e.g., be able to carry out (and preferably is able to carry out) other functions of such devices. Thus it should, as discussed above, be able to provide the audio signal for a call (and, e.g., may include a speaker and/or microphone for this purpose).

The hands-free device may also include (and indeed preferably does include) other user operable controls, in addition to the user control that will activate the direct dial function of the present invention, such as, for example, a power control (on/off switch), a volume control, a control or controls for accepting, rejecting and/or ending a call, a control or controls for carrying out call holding functions, a control or controls for transferring the audio for a call between the hands-free device and the communications device (and vice-versa), a control or controls to activate automatic call pick up and/or voice dialling, etc., a control to mute the microphone of the hands-free device, a control to disconnect the hands-free device from the communications device, a control to check the battery level of the hands-free device, and/or a control or controls for ring tone functions (such as selecting a ring tone), etc.

The communications device that the hands-free device can link to can be any suitable such device, such as a telephone or other communications terminal, a personal computer or a laptop computer. In a preferred embodiment, the communications device is a mobile communications device, such as a mobile phone or radio, a (mobile communications-enabled) personal digital assistant, a laptop computer, or a vehicle mounted communications terminal, etc.

The user-input and user-operable input (control) means that activates the "direct dial" operation of the present invention can be any suitable such input. In a preferred embodiment, it comprises a manually operable control, such as a button or switch on the hands-free device. Such a manual control could, e.g., comprise a simple push-button switch, a rotary dial (e.g. that can also be pressed), and/or a sliding switch, etc., as desired. The control could be, and, indeed, in one preferred embodiment is, a separate control (e.g. button) that is provided on the hands-free device for this purpose. Thus, in a preferred embodiment, the hands-free device includes a separate, dedicated user input, such as a button or rotary dial or switch, specifically for activating the "direct dial" function of the present invention.

In another preferred embodiment, an existing control of the hands-free device, or a control having another function as well, is used to activate the "direct dial" function. In this case, the "direct dial" function could be and is preferably activated in response to a particular, e.g., predetermined, operation of the control (such as activating it, e.g., for a particular, e.g., predetermined, time period).

In a preferred embodiment, the user input to activate the direct dial function is not simply a single, brief press or operation of control in question, but requires an input or sequence of inputs that are less likely to occur unintentionally or accidentally. This helps to avoid unintentional activation of the direct dial function. For example, the necessary user input could require pressing or activating the user control (e.g. button) continually for a selected, e.g., predetermined time period, or making a number of separate activations (e.g. button presses) in a given time period, or a combination user inputs could be required, such as a combination of button presses or a combination of operating the direct call control and another input (such as pressing another button, or speaking a spoken command), etc.

In a particularly preferred embodiment, the hands-free device provides an audible confirmation when the direct dial function is activated. This could, e.g., comprise a simple tone or beep, or be a more detailed spoken message.

The particular phone number that is called in response to the user input can be any suitable number and can be selected as desired. The number could, e.g., and preferably does comprise the phone number of the person or party to be called, but it could also comprise other indications of a communications connection to be made, such as an IP address, a number to which a text (e.g. SMS) message is to be sent or an email address, etc. Most preferably, a previously selected, pre-defined or predetermined number or the like is called in response to the operation of the user-operable input means.

In one preferred embodiment, the hands-free device is arranged to cause the communications device to dial a single, pre-selected number in response to the user input. However, it would also be, e.g., possible to provide a number of different pre-selected numbers that could be dialled. The actual number dialled could then, e.g., be selectable by the user, or be automatically selected, e.g., at random and/or in dependence of the time of day, etc., or the numbers could be dialled in a predetermined sequence.

In a preferred such embodiment, the user can select which number is dialled. This could be achieved, e.g., by having different user inputs triggering the dialling of different numbers. For example, a two (or more) stage user-input could be required, one to select the direct-dial function, and then an input to select the number to be dialled (which could, e.g., comprise a spoken command via a speech recognition interface or a subsequent control activation (e.g. button press or combination of button presses)). The second input in this arrangement could, e.g., simply indicate an index or other identifier that identifies the actual number to be called.

In a particularly preferred embodiment, the "direct dial" operation, and, most preferably, the selection of the number to be called, if required, can be carried out solely via manual operation of the hands-free device (e.g. via button presses or activations, etc.). This allows the system to be used without any voice-activation (which may not always be possible or desirable).

The number or numbers to be called could, e.g., be specified in the hands-free device or in the mobile communications device, or elsewhere in the communications network, e.g., by storing them in a register from which they can be retrieved. The number or numbers could, e.g., be specified by storing the actual numbers to be called, or by storing an identifier, e.g., index, or other data that allows the actual number to be identified.

In a particularly preferred embodiment, the number or numbers to be called (or an identifier or data for the number or numbers to be called) is stored in a memory or memories of or accessible to the hands-free device and/or communications device. Thus, for example, the number or numbers to be called (or identifiers or data therefor) could be stored in a memory of the communications device for retrieval in use.

However, in a particularly preferred embodiment, data relating to the number or numbers to be called and to allow the required numbers to be called is stored in the hands-free device itself. Thus, in a particularly preferred embodiment, the hands-free device includes a memory that stores data indicating or for the number or numbers to be called in response to operation of the particular user, "direct dial", input. This data could, e.g., comprise the actual numbers themselves, identifiers for the numbers, an IP address or an identifier or data therefor that the communications system should connect to, or any other identifier, number, or data needed to identify a communication over a data network (e.g. GPRS, 3G, etc.) etc., as discussed above.

In such an arrangement, the hands-free device would, accordingly, in response to the particular user input, automatically retrieve data regarding the number to be called from its memory, and then command the communications device to attempt to call that number, and/or establish an appropriate communications connection, etc.

Where the number or numbers to be called is, e.g., stored in a memory of the hands-free device, or communications device, then it could, e.g., be stored such that it cannot be changed in use (e.g. by storing it in a ROM or in a write-protected form in flash memory, etc.). This would allow, e.g., the number to be called to be set permanently when the device is manufactured.

However, in a particularly preferred embodiment, the number to be called can be changed or varied in use, e.g., by appropriate reprogramming or reconfiguring of the hands-free device and/or communications device. Thus, for example, where the number or numbers to be called (or identifiers or data therefor) are stored in a memory of the hands-free device or communications device, the memory arrangement is preferably such that the stored numbers, etc., can be altered or set in use.

Thus, in a particularly preferred embodiment, the hands-free device includes a memory for storing data indicating a communications connection to be made, such as a number or numbers to be called, by an associated communications device, which data can be altered in use so as to allow the connection to be made (e.g. the number or numbers to be called) in response to the data in the memory to be changed in use. Thus the hands-free device preferably includes a memory into which data indicating a communications connection to be made by an associated communications device can be repeatedly and/or selectively stored.

In such an arrangement, the storing or changing of data in the memory of the hands-free device can preferably be user-initiated and performed by a user. Thus, the hands-free device preferably includes means for allowing a user to store in a memory of the hands-free device data (such as a number) indicating a communications connection to be made by an associated communications device. This function is preferably controlled by activation of a particular control or input of the hands-free device. Again, the arrangement is preferably such that the user can repeatedly and/or selectively store such data in the hands-free device.

In a preferred embodiment, the data that is stored in the memory of the hands-free device is provided to the hands-free device via a communications device to which the hands-free device is coupled. This could be, e.g., and as will be discussed below, by the hands-free device retrieving the data from the communications device and/or by the communications device transmitting a message or data to the hands-free device. Thus, in a particularly preferred embodiment, the means or step of allowing a user to store data in a memory of the hands-free device stores the data via a communications device to which the hands-free device is coupled.

It would also be possible to allow the data to instead or as well be alterable by, e.g., an external source, such as a communications service provider, if desired.

In a particularly preferred embodiment, any updating or altering of the data stored in the hands-free device can be carried out in use, and preferably while the device is coupled to a communications device (rather than, e.g., having to couple the hands-free device to a fixed or "base" unit to allow the updating to be performed (such as would be the case for updating the number via a personal computer (PC)).

The provision of a hands-free device having a programmable memory into which data indicating a number to be called via a "direct dial" operation of the hands-free device can be stored and configured, e.g., by a user, is believed to be particularly advantageous. For example, because the, e.g., number or numbers to be called are stored in the hands-free device, the direct dial operation is readily portable between different communications devices that the hands-free device may be used or useable with (rather than the user, e.g., having to configure each communications device individually for this function). Allowing the data (number) to be programmable in the hands-free device allows the user to configure the direct-dial function to an, e.g., number or numbers of their choice, rather than having to be constrained to a pre-selected number. It also facilitates the user more frequently and readily reconfiguring the number to be called using the direct dial operation, for example, where the user knows that they may be likely to use a particular number for a short period, but may then prefer to be able to call a different number thereafter.

It is accordingly believed that these arrangements may be new and advantageous in their own right. Thus, according to a third aspect of the present invention, there is provided a hands-free device for a communications device, comprising:

a user-operable control means;

a memory for storing data indicating a communications connection to be attempted to be established by a communications device in response to operation of the user-operable control means of the hands-free device; and means for providing the stored data indicating a communications connection to be attempted to be established to a communications device in response to an operation of the user operable control means.

According to a fourth aspect of the present invention, there is provided a hands-free device for a communications device, comprising:

a user-operable control means;

a memory;

means for allowing a user to store data indicating a communications connection to be attempted to be established in the memory of the hands-free device.

As will be appreciated by those skilled in the art, these aspects and embodiments of the invention can, and preferably do, include any one or more or all of the preferred and optional features of the invention described herein, as appropriate. Thus, for example, the data stored in the memory of the hands-free device preferably indicates or comprises a number to be called by a communications device coupled to the hands-free device in response to the operation of the user-operable control or input means. Similarly, the hands-free device preferably further comprises means for providing to a communications device in response to an operation of a user operable control means of the hands-free device the stored data indicating a communications connection to be attempted to be established.

The hands-free device preferably stores (data relating to) a limited number of numbers to be called, such as one number, or, e.g., 1 to 5 numbers.

As discussed above, the reprogramming or changing of the (data relating to the) stored number or numbers or the like to be called by the direct dial function can preferably be carried out by a user and/or by the communications network service provider. It can be carried in any suitable and desired manner.

In one preferred embodiment, the hands-free device and/or communications device includes an input, such as a data port connection (e.g. to allow a user to connect the hands-free device, etc., to their PC), via which the stored numbers, etc., can be changed. It is also preferably possible for the stored data (e.g. number or numbers), etc., to be instead and/or additionally alterable via the user interface of the hands-free device and/or communications device. For example, a user could enter a new number via their phone keypad.

In a particularly preferred embodiment, the data (e.g. number) can be updated or changed by sending a short data message (SMS or SDS message) to the mobile communication device to which the hands-free device is coupled. Such a short data message could, e.g., comprise an appropriate command to the communications device and/or hands-free device, together with the necessary information to be stored for the new number or numbers. This would allow, e.g., a mobile phone service provider to change the number that is dialled by sending, e.g., an SMS message to the user's mobile phone. Preferably in this arrangement, the data in the short data message is automatically stored in the hands-free device once the message is received, without the need for user intervention or action.

In a particularly preferred embodiment, the user can use the communications device and/or hands-free device directly to set and store the number or data that is to be called or used in response to the "direct dial" input. Most preferably, the hands-free device includes control means, such as a button or other input, that the user can activate (operate), e.g. in a predefined manner, to cause the hands-free device to store a number, data or the like in its memory. Such a control means could, e.g., comprise the same control as will activate the "direct dial" function, as a different control.

In one preferred such arrangement, the control can activate the sending of a message to the communications device and hands-free device via which the data will be stored in the hands-free device as discussed above.

In another preferred such arrangement, the user can set the hands-free device (or communications device) to record and store an incoming number (the number of an incoming call), e.g., the last incoming number, for this purpose. For example, an operation of the "direct dial" control (or another control) on the hands-free device, when a call is received, could be used to cause the hands-free device to store the incoming number in its memory. Such arrangements would allow the "direct dial" function of the present invention to be used to, e.g., return a previously received call.

It is also preferably possible for the hands-free device to be additionally and/or alternatively configurable by a user such that, for example, if a call is not answered by the user, the number of the missed call, which is typically stored by the communications device, is stored in the memory of the hands-free device as the particular number to be called. Alternatively or additionally, the hands-free device is preferably configurable to store an, e.g. the last, outgoing number dialled from the communications device in its memory as the particular number to be called.

In a particularly preferred arrangement, the hands-free device can be arranged to retrieve and then store in its memory a number or numbers (or data relating thereto) from a store, such as a phonebook of a (or the) communications device. This would facilitate the hands-free device retrieving or downloading a number to be stored in the hands-free device from a memory of the communications device.

In a particularly preferred such arrangement, the hands-free device can be activated automatically and/or by the user to retrieve and store the particular number to be called from a memory, e.g., the phonebook, of the communications device. Preferably the particular data or number to be retrieved is stored in a predefined entry (which can preferably be edited by the user) in the memory (phonebook), which the hands-free device can then search for and retrieve data from.

Thus, in a particularly preferred embodiment, the hands-free device can be arranged to and includes means to retrieve and store in its memory data from a particular, preferably predetermined or predefined, location, e.g., phonebook entry, in a communications device (e.g. a location or phonebook entry having a particular name or identifier). This would allow, e.g., a user to store the desired number, etc., in the particular location (e.g. under the particular phonebook entry or agenda) and then command the hands-free device to retrieve and store that entry.

It is also preferably possible for the hands-free device and/or communications device to as well and/or instead be controlled to cause a message to be sent to another device to instruct that device to call the communications device to which the hands-free device is coupled, so that, when the call is made, the hands-free device can store the incoming number as discussed above.

The hands-free device could carry out only one of the above data storing operations, but preferably the hands-free device can perform a plurality, such as two or more or all, of the above operations (in any of the possible combinations, as desired).

It is again believed that these arrangements may be new and advantageous in their own right. Thus, according to a fifth aspect of the present invention, there is provided a method of operating a hands-free device for a communications device, which hands-free device includes a memory and a user-operable control means, the method comprising:

the hands-free device detecting a particular operation of the user-operable control means; and in response to such detection, storing in the memory of the hands-free device data indicating a communications connection to be attempted to be established.

Again, as will be appreciated by those skilled in the art, this aspect and embodiments of the invention can and preferably do include any one or more or all of the preferred and optional features of the invention described herein, as appropriate. Thus, for example, the data that is stored in the memory of the hands-free device preferably indicates or comprises a number or the like to be called, preferably in response to a particular input operation to the hands-free device.

Similarly, the hands-free device preferably in response to the operation of the user-operable control preferably retrieves and stores data from a communications device to which the hands-free device is coupled, and/or detects whether the communications device to which the hands-free device is coupled is making or receiving a call, and in response thereto, stores in its memory the outgoing called number, or the incoming caller's number, respectively.

According to a sixth aspect of the present invention, there is provided a method of operating a hands-free device for a communications device, which hands-free device includes a memory for storing data indicating a communications connection to be attempted to be established by a communications device and a user-operable control means, the method comprising:

the hands-free device detecting a particular operation of the user-operable control means; and in response to such detection, transmitting to the communications device to which the hands-free device is coupled, the stored data indicating a communications connection to be attempted to be established by a communications device.

Again, as will be appreciated by those skilled in the art, this aspect of the invention can and preferably does include any one or more or all of the preferred and optional features of the invention described herein, as appropriate.

The service or contact called by the selected number or numbers that is to be called in response to the user input can be selected as desired. For example, particularly where the number can be set by a user, it could simply comprise, e.g., a number that the user frequently calls, such as their home or office, or a particular contact person.

In a preferred embodiment, particularly where the number can be set by a communications network operator or service provider, the preselected number is set to call, e.g., voice portal services, or other customer or information services offered by the communications network. Such services could comprise, e.g., information and news services, traffic reports, weather forecasts, directory enquiries services, game services, etc. It would also be possible, e.g., for the number to dial a more general customer services portal, from which particular services may then be requested, e.g., via spoken commands to a voice recognition system in the network infrastructure. It would also be possible for the "call" to the number to set up a data connection (e.g. GPRS, 3G, Internet, or the like, etc.) e.g. through which the user could then, e.g., send voice commands that could be recognised on a remote server application for communication and services purposes. Indeed, a particular advantage of the present invention is that it provides a fast and efficient way to access customer and network services provided by a communications system in a hands-free manner, and without the need, e.g., for a user to physically dial the service in question using their phone.

It should be noted here that the call that is made in response to the "direct call" user input may accordingly be, e.g., to establish a two-way, conversational call, a video call, or simply to, e.g., access and listen to pre-stored spoken message or report. It could also be, as will be discussed below, to send a text (e.g. SMS) message or email to a given recipient.

The hands-free device can cause the communications device to call the particular number in any appropriate manner. Thus, it preferably sends a call request or command to the communications device together with (an indication of) the number to be called.

The actual format of such a call request will, as will be appreciated by those skilled in the art, depend, e.g., on the nature of the link between the hands-free device and the communications device (e.g. the standard that the link conforms to). However, the call request should at least indicate that a direct dial call is required, and also identify the number to be called or the communication connection to be established (which could be done, e.g., by including the number, or an identifier for the number, to be called in the call request).

For example, where the number to be called is stored on the hands-free device, the message sent to the mobile communications device could include the number itself. On the other hand, where the number to be called is stored on the mobile communications device, then it may be enough for the message simply to indicate (request) that a direct dial call, i.e., a call to the preselected number, is to be made.

It should be noted here that, as discussed above, in the present invention, while the data relating to the particular number to be called preferably comprises a telephone number or the like, it need not comprise (or need not only comprise) a telephone number or the like to be called, but may instead and/or additionally comprise, e.g., an address and/or other data for establishing a communication with a particular recipient and/or for establishing a communications connection or channel or path. It may also include other data, such as commands, etc., that may be needed to establish the call, etc.

For example, in the case of using the direct dial operation to establish a video call with a particular recipient, data comprising the contact number of the video device of the recipient and/or one or more commands and data to establish the video call could be stored on the hands-free device for provision to the communications device (with the commands and video call set-up data, e.g., being tagged to the number for being sent to the communications device from the hands-free device, or being sent in a separate message to the communications device). It would also be possible, e.g., for the necessary video call establishing commands and data to be stored on the communications device and automatically activated when an instruction for a video call is received from the hands-free device.

Alternatively or additionally, the data stored on the hands-free device for attempting to establish a communication with a particular recipient may comprise an address, for example an IP address, for establishing communication with, e.g. a Web server or another IP communications network or device, such as a portal of a service provider. Thus the communications link to be established could also, e.g., be a data link, over a data network, e.g. that sends data, and/or voice information in another format (such as distributed speech recognition data), or for setting up a video call, etc.

In a still further preferred arrangement, the hands-free device and/or the communications device may be configured such that, e.g., a short data message (SMS or SDS message) and/or an e-mail can be sent to a predetermined recipient in response to detection of user operation of the user-operable input means.

In a particularly preferred such embodiment, the, e.g., SMS, message may comprises an SMS having a predefined format (which may be and preferably is editable by the user) that can be automatically sent to the particular recipient in response to detection of user operation of the user-operable input means. Such a predefined message could, e.g., be (and preferably is) stored on the hands-free device, and/or could be stored on the communications device. For example, it may be desirable to have a pre-programmed SMS that is sent to the user's spouse or partner informing them that the user is, say, on their way home. Thus, in a preferred embodiment, the hands-free device stores a message or messages for transmission via the communications device, together with data indicating where the message is to be sent.

In accordance with a further aspect of the present invention, there is provided a hands-free device for a communications device, comprising a user-operable input means, means for detecting user operation of the user-operable input means, and means for causing a communications device to which the hands-free device is coupled to attempt to establish communications with a particular recipient in response to detection of user operation of the user-operable input means.

This aspect and embodiments of the invention again can and preferably do include any one or more or all of the preferred and optional features of the invention described herein, as appropriate. Thus, for example, the communications with a particular recipient can and preferably do comprise sending or attempting to send an SMS or other data message (e.g. e-mail) to the number or address of the particular recipient.

It should be noted here that, as will be appreciated by those skilled in the art, although the operation of the present invention causes the communications device to make a call or to establish communication to the particular number, etc., in question, it is not necessarily the case that when the call or the like is made, a full communications connection to the particular number or recipient will be able to be established (since the number may at the time be, for example, unavailable or engaged or the recipient may be unobtainable). Thus references herein to the communications device calling the particular number or numbers (or the device attempting to establish a communication with a particular recipient, etc.) are intended to refer to the process of the communications device calling the number or otherwise attempting to establish a connection or communication, whether or not a communications connection is then successfully established (i.e. the call or the like is completed) or not.

In a preferred embodiment if, when the call or the like is made, a connection cannot be established, the user is preferably advised of this (e.g. by means of an engaged tone or other message). It is also preferred in such circumstances for the hands-free device to note that the call was unsuccessful, and to automatically repeat the call (communication) attempt (e.g. after a predetermined delay).

The methods in accordance with the present invention may be implemented at least partially using software, e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data-processing system. The invention also extends to a computer software carrier comprising such software which when used to operate a personal communications system or hands-free device comprising data processing means causes in conjunction with said data processing means said system or device to carry out the steps of a method or of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of preferred embodiments of the present invention will now be described by way of example only and with reference to the accompanying drawings, in which.

Figure 1:
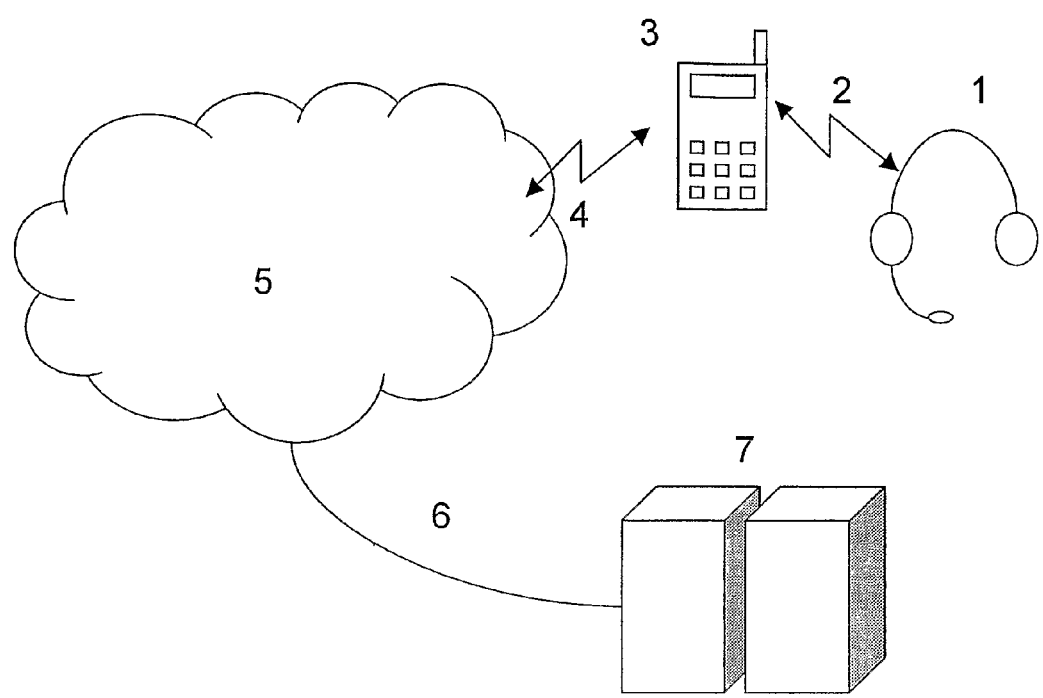
FIG. 1 shows schematically an arrangement of a hands-free device and communications device.

FIG. 1 shows schematically an arrangement of a hands-free device 1 that is linked via a short range radio frequency (RF) communications link 2 to a mobile communications device 3 in the form of a mobile phone that is in communication via an RF link 4 with a mobile communications network 5. FIG. 1 also shows a server 7 of a mobile network operator or service provider that is connected via a link 6 to, and may be accessed via, the mobile communications network 5.

In FIG. 1, the hands-free device 1 is shown as being in the form of a headset for wearing on the user's head. However, it could, of course, take other forms, such as be a car or vehicle-mounted hands-free kit. Equally, although the communications device 3 has been shown as being a mobile phone, it could be any other form of communications device (whether mobile or otherwise), such as a mobile radio, personal digital assistant, or a vehicle-mounted mobile terminal, or a Personal Computer or a laptop computer connected to a data network such as the Internet.

The hands-free device 1 is linked to the mobile communications device 3 by means of a short range RF link 2 that operates according to the Bluetooth protocol. However, other short range RF communications protocols, or indeed, other non-RF, wireless links, such as a magnetic induction link, could be used to couple the hands-free device to the mobile communications device 3 instead. A wired connection between the hands-free device 1 and the mobile communications device 3 would also be possible.

As is known in the art, the link 2 between the hands-free device 1 and the mobile phone 3 acts, inter alia, to redirect all the audio for a call from the mobile phone 3 to the hands-free device 1, such that a user can participate in a call via the hands-free device 1. The hands-free device 1 can also control certain functions of the mobile communications device 3, such as being able to accept or reject an incoming call. It also includes a volume control for its audio playback.

Figure 2:
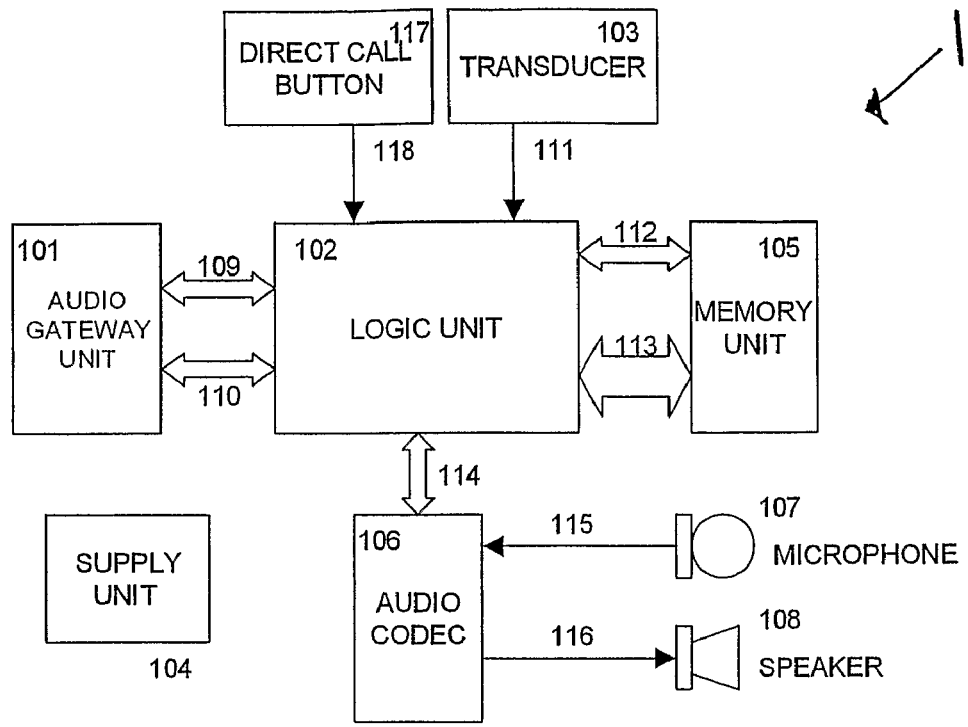
FIG. 2 shows schematically the hands-free device of FIG. 1.
Figure 3:
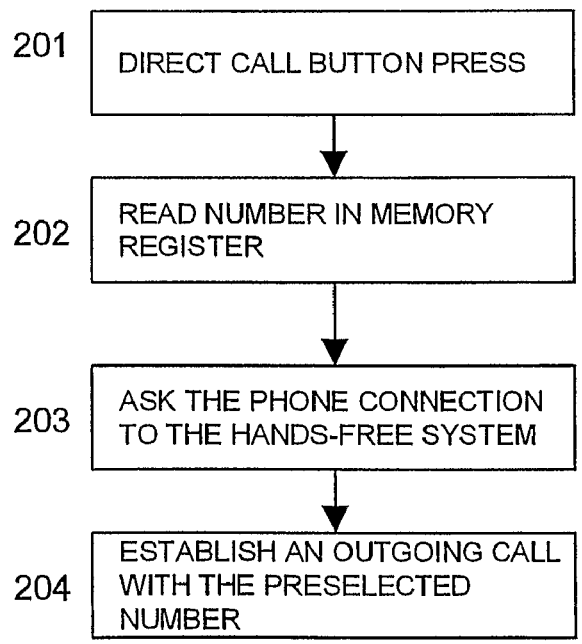
FIG. 3 shows schematically the operation of the hands-free device of FIG. 2.

FIG. 2 shows the architecture of the hands-free device 1 in more detail.

As shown in FIG. 2, the hands-free device 1 includes, inter alia, a logic unit 102, a memory unit 105, an audio gateway unit 101, a supply unit 104, an audio codec 106, a microphone 107, a speaker 108, a transducer unit 103, and a so-called "direct call" button 117. In the present embodiment, the audio gateway unit 101, the logic unit 102 and the audio codec 106 are embedded in a single chip circuit. However, other arrangements would, of course, be possible.

The logic unit 102 of the hands-free device 1 controls the hands-free device 1, and executes the functions required to operate it. It also controls communication between the hands-free device 1 and the mobile communication device 3, and acts upon commands input to the hands-free device 1 by a user. In the present embodiment, this logic unit 102 is in the form of a microprocessor or digital signal processor (DSP). (However, other arrangements, such as a micro-controller, an FPGA unit, an application specific integrated circuit (ASIC), or combination of these devices could also be used for the logic unit 102.)

The audio codec unit 106, together with the microphone 107 and speaker 108 provides, as is known in the art, the audio signals and corresponding electrical signals for transmitting and receiving the audio signal for a call to and from the hands-free device 1. Thus, for example, the audio codec unit 106 converts electrical signals 115 coming from the microphone 107 into data 114 that can be processed by the logic unit 102 for onward transmission to the mobile communications device 3. Similarly, the audio codec unit 106 converts data 114 provided by the logic unit 102 into electrical audio signals 116 to be sent to the speaker 108 for audio reproduction. Alternatively, or additionally, the audio codec could do any signal processing for formatting the speech signal in a form that is required for the type of communications system and/or protocol that is being used (for example, it could extract data for use by an appropriate distributed speech recognition system, where such an arrangement is being used). More than one microphone and/or speaker may be provided in the hands-free device 1, if desired.

The memory unit 105 stores all the data required to operate the hands-free device 1 and can be accessed by the logic unit 102 by means of control signals 112 that can be exchanged between the memory unit 105 and the logic unit 102 in order to store or retrieve data 113. The memory unit 105 is non-volatile and electronically writable. In the present embodiment it comprises a flash memory device, but other arrangements, such as a RAM memory or a combination of ROM and RAM or a memory extension such as an external memory stick, would also be possible.

The transducer 103 of the hands-free device 1 provides the user interface or MMI (man-machine interface) that allows the user to control the hands-free device (and thereby the mobile communications device to which it is coupled). In the present embodiment, this transducer unit 103 comprises one or several user-operable switches that may be operated by a user in predefined combinations or sequences to, for example, control the volume of the audio signal provided by the hands-free device 1, initiate or end a call through the mobile communications device, respond to or reject an incoming call, etc. The transducer unit 103 provides logic signals 111 to the logic unit 102 in response to the user inputs, and the logic unit 102 then interprets those signals and controls the hands-free device 1 and the mobile communication device 3 accordingly.

Other arrangements for the transducer 103, such as it comprising a keyboard, or a speech-enabled interface, would be possible, if desired.

The audio gateway unit 101 provides the interface and link between the hands-free device 1 and the mobile communications device 3 to which it is coupled. As discussed above, in the present embodiment, the audio gateway unit 101 links the hands-free device 1 and the mobile communications device 3 by means of a short range RF Bluetooth communications link. The audio gateway 101 transmits and receives commands and control signalling 109, and the audio signal 110 for a call, between the hands-free device 1 and the mobile communications device 3.

The power supply unit 104 provides energy to all the active circuits of the hands-free device 1. In the present embodiment this power supply unit 104 comprises a battery (together with any necessary associated circuitry). However other arrangements would be possible, such as a DC/DC converter when the hands-free device is to be powered by a constant current source, or an AC/DC converter for use with an alternating current source.

The direct call button 117 of the hands-free device 1, once activated, sends to the logic unit 102 a signal 118 that activates the direct calling of a predefined number by the mobile communications device 3 in accordance with the present invention. In the present embodiment, this direct call button 117 is provided in the form of a separate, dedicated push-switch on the hands-free device 1. However, the direct call function in accordance with the present invention could also be provided by, e.g., a special or selected, particular form of activation of an existing switch or control provided by the transducer 103. The direct call button 117 could also, e.g., be arranged to have more than one function, e.g., depending on how it is operated, if desired. (It should also be noted here that although the direct call button 117 has been shown as a separate component in FIG. 2, it would in practice be part of the overall user interface (MMI) provided by the transducer 103.) In the present embodiment, the direct call button 117 is arranged such that it will not activate the direct call function unless the direct call button 117 is operated in a particular way. In particular, the direct call button must be pressed for a long press (2 seconds) first, and then, in response to an audio feedback from the hands-free device 1, pressed again, to activate the direct call function. (Other arrangements would, of course, be possible.) This helps to avoid an intentional or accidental activation of the direct call button.

The hands-free device 1 is also arranged to provide an audible confirmation that the direct call function has been activated.

In order to facilitate the direct call operation of the present embodiment, the memory unit 105 stores information or data regarding the phone number to be called when the direct call button 117 is activated. In the present embodiment, this stored information comprises the actual phone number to be called, but it could, e.g., instead comprise data or information, such as an index, that will allow the phone number to otherwise be identified. Alternatively, the stored information may comprise other data such as an address, e.g. an IP address or an e-mail address, or other information for identifying a recipient to establish communication with (which communication could be data, text, voice, video communication or the like).

In the present embodiment, when the hands-free device 1 is first manufactured, a selected, default, direct call number is prestored in the memory unit 105.

In the present embodiment, the number (or number identifier) stored in the memory unit 105 for the direct call function can be changed or configured in use. To facilitate this, a data connection port for coupling the hands-free device 1 to a user's personal computer for this purpose is provided to allow a user to use their PC to reprogram the number stored in the memory unit 105.

The number stored in the memory unit 105 can also be updated by means of a short data message, such as an SMS message, that can be sent by, e.g., the mobile communications network operator. In this arrangement, the hands-free device 1 will request the short data message from the communications device 3 (once it has been received), and retrieve from the message the new phone number to be stored (which number may, e.g., be contained in the message body or in the "sent from" field information).

It is also possible for the number stored in the memory unit 105 to be changed via the user interface (MMI) of either the hands-free device 1, and/or the mobile communications device 3. In this arrangement, a user could, for example, send a short data message to a customer services portal of the mobile network operator, and the operator could then call back the user to explain the steps that the user must follow in order to store the number of the selected service.

The user can also instruct the hands-free device 1 to store the number of an incoming call into the memory unit 105 for use as the number to be called when the direct call button 117 is activated. This can be done, e.g., by the user pressing the direct call button 117 when a call is received.

The direct call button 117 can also be activated to cause the hands-free device 1 to search through a memory, e.g., phonebook, of the communications device 3 until it finds a particular entry (agenda) and to then copy that entry to its memory 105 for use as the number to be called when the direct call button 117 is activated. This allows a user to store the desired number in the mobile communications device 3 and then transfer it to the hands-free device 1 for use for the direct call function.

The stored number that is to be called by the direct dial function can be selected as desired. For example, where the number is user-configurable, it could, e.g., comprise a preferred contact number of the user, such as their home or office. On the other hand, particularly where the number is configured upon manufacture of the hands-free device, and/or may be provided by a mobile communications network operator, then the number could, e.g., comprise the number of a portal or information service provided by the mobile communications network, such as, for example, news, road traffic, or weather reports, directory enquiry services, games services, etc.

The phone number to be retrieved and used upon activation of the direct call button could, e.g., be stored in the memory unit 105 when the hands-free device 1 is manufactured.

Although, as discussed above, in the present embodiment, the number or number identifier stored in the memory unit 105 can be altered in use, it would also, e.g., be possible to store it in such a manner that it cannot be changed in use. This would be the case, where e.g., a ROM memory is used for the memory unit 105. Alternatively, a flash memory device could, e.g., be "locked" so that the number cannot be rewritten. This arrangement would fix the number to be called using the direct dial function of the hands-free device 1 to a number that is, e.g., set on manufacture of the device.

FIG. 2 shows the sequence of events that are followed when the direct call button 117 is activated by a user.

As shown in FIG. 2, when a user presses the direct call button 117 (step 201) the logic unit 102 of the hands-free device 1 interprets this command and accesses the memory unit 105 to read the phone number that has been stored in it for this purpose (step 202). A connection is then established by the audio gateway unit 101 with the mobile communications device 3 (step 203) and a request sent to the mobile communications device 3 to make a call to the number read from the memory 105 register (step 204) (or to set-up the appropriate voice/data communication channel where appropriate, e.g. for a video call, data transmission, voice over IP call, data link for distributed speech recognition, etc.). The mobile communications device 3 will then make a call to the number and attempt to establish an out-going call to the selected number. If the call is successfully established, an audio channel between the mobile communications device and the requested number is established and provided to the user via the hands-free device 1. The audio of the call is directed to the hands-free device 1.

It can be seen from the above that the present invention, in its preferred embodiments at least, can be used to provide fast and direct access to a particular contact or communications network service in a hands-free manner. This increases comfort, convenience and ease of use, and, furthermore, facilitates the accessing of such services where normal dialling may be undesirable, for example while driving.

The present invention also provides, for example, a means whereby a mobile communications network operator can provide or offer services to users and/or for end users to configure their mobile phones to their personal requirements. The fact that the call and service is activated by the hands-free device (that therefore has audio-functionality) also helps to prevent a user from not realising that they have dialled the call.

This is achieved, in the preferred embodiments at least, by providing a push button or other user operable control on a hands-free device that can be used by a user to make a direct call to a pre-configured number, such as a service portal offered by a communications network operator, and/or a number configured or selected by the user.

As will be appreciated from the above, the call that is made could, e.g., be a voice call, a data link or transmission, a video call, a Voice Over Internet Protocol (VoIP) call, etc. Equally, it would be possible for the hands-free device to have, as discussed above, plural different numbers or communications connections that can be activated via the direct call function (via the same or different user controls (inputs)), and in such a case, each number or connection could be to the same or different types of communications links (such as voice calls, video calls, data links, etc.), as desired.

The invention claimed is:

1. A hands-free device for a mobile communications device, comprising:

a user-operable input means;

means for detecting user operation of the user-operable input means, wherein the hands-free device is head-mounted and has at least one of a speaker and a microphone;

a programmable memory for storing data; and means for causing a communications device to which the hands-free device is coupled to attempt to establish a predetermined communications connection indicated by data stored in the memory in response to detection of user operation of the user-operable input means, wherein the data indicating the predetermined communications connection to be established includes at least one of a number and an address to be called;

wherein the hands-free device further comprises means for allowing a user to store in the programmable memory of the hands-free device the data indicating the predetermined communications connection to be established; and wherein the memory is programmable by the user such that the data indicating the predetermined communications connection to be established can be changed in use by the user.

2. The hands-free device of claim 1, wherein the user-operable input means is causing a communications device to attempt to call a particular number and at least one further function.

3. The hands-free device of claim 2, wherein the particular number to be called is selectable from one of a plurality of different predetermined numbers.

4. The hands-free device of claim 1, further comprising means for providing an audible confirmation in response to the operation of the user-operable input means.

5. The hands-free device of claim 1, wherein the programmable memory for storing data indicates a particular number to be called.

6. The hands-free device of claim 1, wherein the means for allowing a user to store in the memory data indicating a communications connection to be attempted to be established of the hands-free device stores the data via the communications device to which the hands-free device is coupled.

7. The hands-free device of claim 1, further comprising means for providing the stored data indicating at least one of the particular number to be called and the communications connection to be attempted to the communications device in response to activation of the or of a user-operable input means.

8. The hands-free device of claim 1, further comprising means for recording and storing an incoming or outgoing number as the particular number to be called on the hands-free device.

9. The hands-free device of claim 1, further comprising a memory and means for storing in the memory data stored in a memory of a communications device to which the hands-free device is coupled.

10. The hands-free device of claim 1, wherein the user-operable input means further comprises a manual operable control having at least one manually-activated switch.

11. A method of operating a hands-free, head-mounted device for a mobile communications device, the hands-free, head-mounted device including a programmable memory for storing data indicating a predetermined communications connection to be established by a communications device, means for allowing a user to stored in the programmable memory of the hands-free, head-mounted device the data indicating the predetermined communications connection to be established, a user-operable control means and at least one of a speaker and a microphone, the method comprising:

detecting a particular operation of the user-operable control means; and in response to such detection, causing a communications device to which the hands-free, head-mounted device is coupled to attempt to establish a predetermined communications connection indicated by the data stored in the memory, wherein the data indicating the predetermined communications connection to be established comprises at least one of a number and an address to be called, wherein the data can be changed in use by the user.

12. The method of operating a hands-free, head-mounted device of claim 11, further comprising:

the hands-free device selecting one of a plurality of different predetermined numbers as the number to be called.

13. The method of operating a hands-free, head-mounted device of claim 11, further comprising:

the hands-free device providing an audible confirmation in response to detection of the user input.

14. The method of operating a hands-free, head-mounted device of claim 11, further comprising:

storing data for indicating a particular number to be called in the memory of the hands-free device.

15. The method of operating a hands-free, head-mounted device of claim 14, wherein the step of storing data in the memory of the hands-free device further comprises storing data in the memory via a communications device to which the hands-free device is coupled.

16. The method of operating a hands-free, head-mounted device of claim 14, further comprising:

the hands-free device providing the stored data indicating the particular number to be called or be established to the communications device in response to activation of a user-operable input means.

17. A method of operating a hands-free, head-mounted device of claim 11, which hands-free device includes a memory and a user-operable control means, the method comprising:

in response to detecting a particular operation of the user-operable control means, storing in the memory of the hands-free device data indicating a communications connection to be attempted to be established.

18. The method of operating a hands-free, head-mounted device of claim 11, further comprising:

recording an incoming or outgoing number; and storing the recorded number as the particular number to be called on the hands-free device.

19. The method of operating a hands-free, head-mounted device of claim 11, further comprising the hands-free device fetching from a communications device to which the hands-free device is coupled data indicating a communications connection to be attempted to be established and storing the data in the memory of the hands-free device.

20. The method of operating a hands-free, head-mounted device of claim 11, further comprising:

the hands-free device sending a call request to the communications device together with the particular number to be called.

21. The method of operating a hands-free, head-mounted device of claim 11, further comprising:

a memory of the hands-free device storing a message to be transmitted; and the hands-free device, in response to detection of operation of the user operable input means, sending the stored message to the communications device for transmission by the communications device.

22. A computer program element comprising computer software code portions embodied on a computer readable medium for performing the methods of claim 11, when the program element is run on data processing means in communication with the computer readable medium.

\* \* \* \* \*